Figure 1:
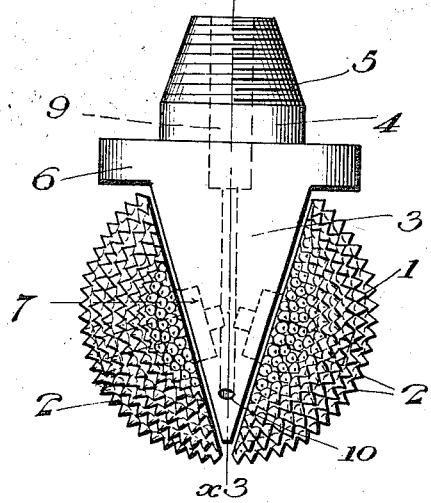

T. J. GRIFFIN.
ROTARY DRILL.
APPLICATION FILED SEPT. 27, 1913.

1,195,208.

Patented Aug. 22, 1916.
3 SHEETS—SHEET 1.

Witnesses:

Inventor:
Thomas J. Griffin

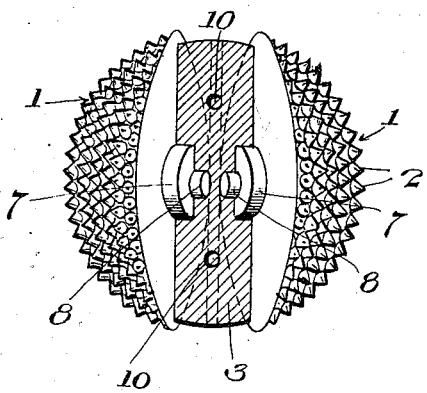
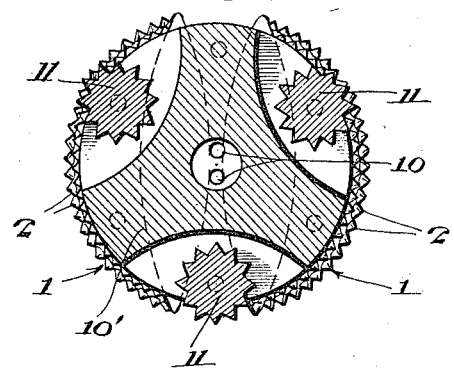
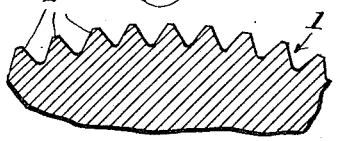
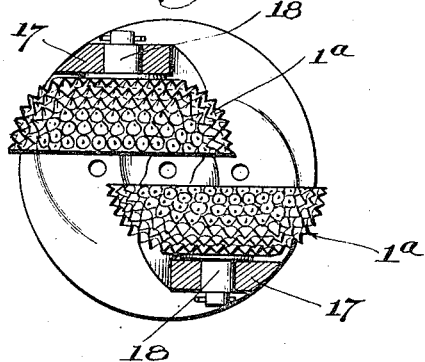
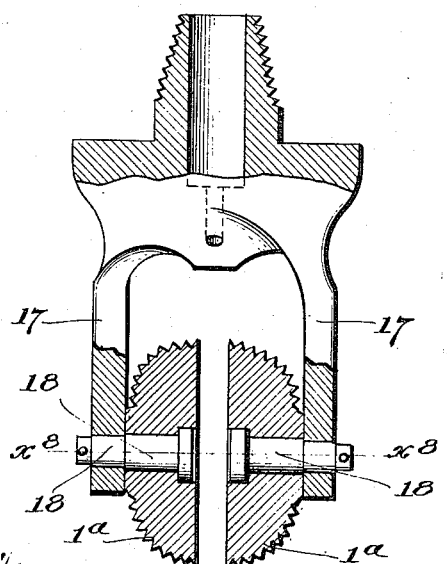
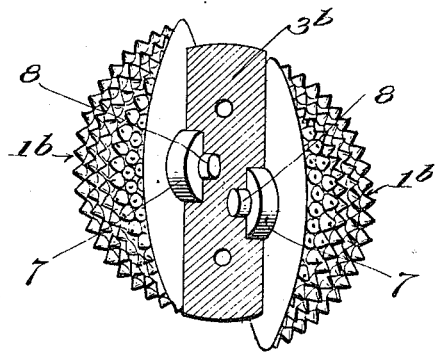

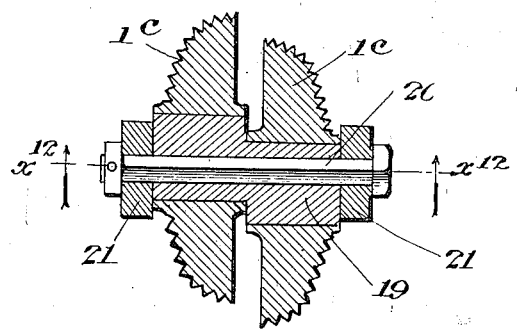
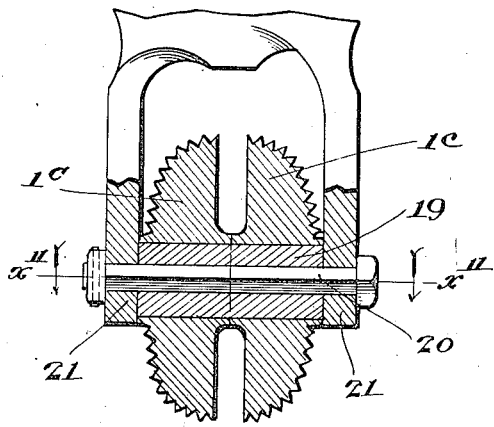
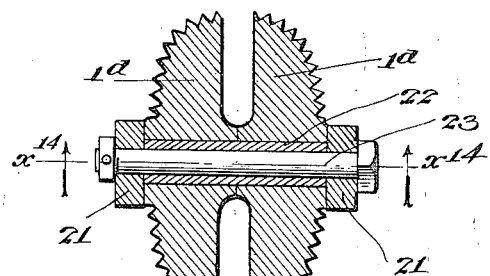
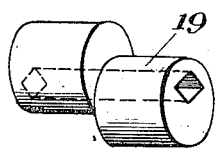
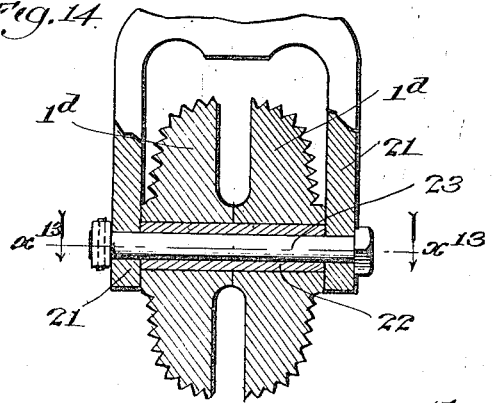
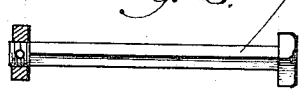

UNITED STATES PATENT OFFICE.

THOMAS J. GRIFFIN, OF LOS ANGELES, CALIFORNIA, ASSIGNOR, BY MESNE ASSIGNMENTS, TO SHARP-HUGHES TOOL COMPANY, OF HOUSTON, TEXAS, A CORPORATION OF TEXAS.

ROTARY DRILL.

1,195,208.     Specification of Letters Patent.     Patented Aug. 22, 1916.

Application filed September 27, 1913. Serial No. 792,151.

*To all whom it may concern:*

Be it known that I, THOMAS J. GRIFFIN, a citizen of the United States, residing at Los Angeles, county of Los Angeles, and State of California, have invented a new and useful Rotary Drill, of which the following is a specification.

This invention relates to rotary drills adapted for drilling oil wells or water wells by the rotary method, and the main object of the invention is to provide a drill in which there will be a minimum cutting area at work while the drill is operating.

A further object is to provide a drill in which the cutting teeth instead of having cutting edges of more or less elongation consists of spikes, spurs or projections which may be numerous and located over a considerable area, thereby forming a free cutting tool on account of the cutting elements being spaced apart and causing a free cutting action which will not clog and is adapted for drilling in either hard or soft formations.

A further object is to arrange the cutting projections on a plurality of rotating members which together form substantially a sphere, the spherical surface of each member being studded with the cutting projections except for the portion occupied by the supporting means. The cutters of this form are of great strength and as the entire area of each cutter is employed in the work, their durability far exceeds that form of cutter in which the cutting is limited to a single rim or edge which rapidly wears down and decreases in diameter.

Another object is to construct the cutting projections in conical form, thereby giving them the maximum solidity and strength, with small cutting points which readily penetrate the material in cutting. This form of cutter operates in a distinctly different way from cutters as heretofore constructed in which the cutting is performed by an elongated cutting edge which acts to shear or shave off the material. The present form of cutter does not act to shave the material, but the cutting projections penetrate the material and cut through it, dividing it up into small particles which are forced out of the hole by the entering stream of water. Owing to the separated position of the numerous cutting points, the drill does not have a mashing effect on the loosened material, tending to compress or pack it, but on the contrary, the numerous cutting points have a tendency to keep the material loosened up so that it is readily removed from the hole when cut. Owing to this shape of the cutters they may be constructed very economically as they may be forged by means of dies, or may be cast and there are no machine operations required to construct the cutting projections.

The peculiar shape of the cutting members gives them a solidity and strength far beyond that of any cutter of disk like form.

Figure 2:
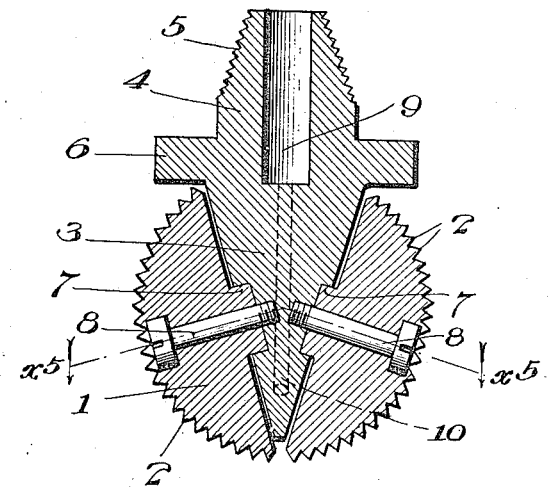
Figure 3:
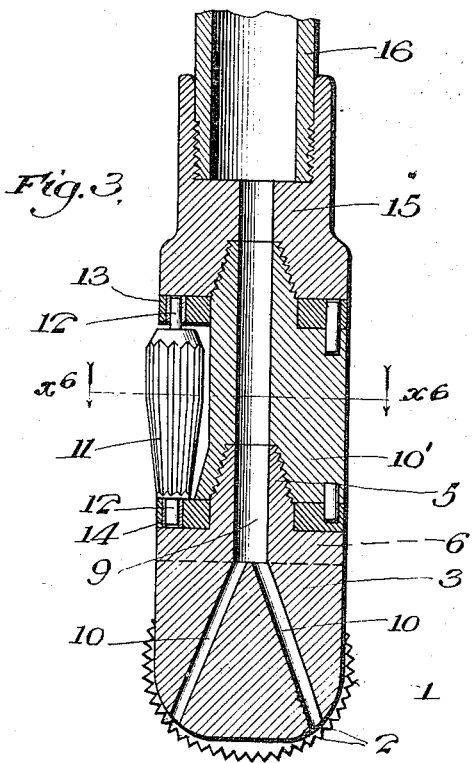
Figure 4:
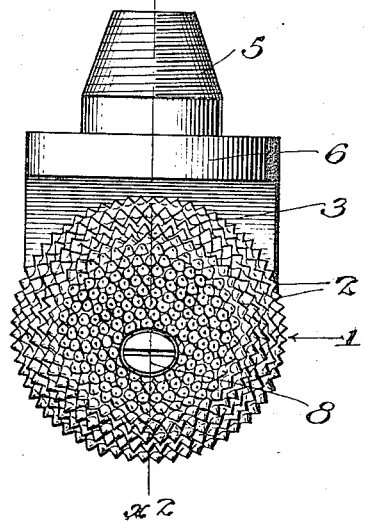

Referring to the drawings: Figure 1 is a side elevation of one form of the drill. Fig. 2 is a vertical section on line $x^2$—$x^2$, Fig. 4. Fig. 3 is a vertical section on line $x^3$—$x^3$, Fig. 1. Fig. 4 is a side elevation at right angles to the view shown in Fig. 1. Fig. 5 is a section on line $x^5$—$x^5$, Fig. 2, the cutters being shown in elevation. Fig. 6 is a section on line $x^6$—$x^6$, Fig. 3. Fig. 7 is an enlarged section taken diametrically through one of the cutters to illustrate the outline of the cutting projections. Fig. 8 is a bottom plan view, partly in horizontal section, taken on the line $x^8$—$x^8$ of Fig. 9. Fig. 9 is a side elevation partly in section of a form in which the cutting members are supported by a fork. Fig. 10 is a view similar to Fig. 5, showing one form of my invention in which the cutters are offset. Fig. 11 is a section on line $x^{11}$—$x^{11}$, Fig. 12, showing another form. Fig. 12 is a section on line $x^{12}$—$x^{12}$, Fig. 11. Fig. 13 is a section on line $x^{13}$—$x^{13}$, Fig. 14, showing another form. Fig. 14 is a side elevation partly in section, showing the form illustrated in Fig. 13. Fig. 15 is a perspective of the eccentric sleeve used in Fig. 11. Fig. 16 is a side elevation in detail of the supporting bolt shown in Figs. 11 and 12 inclusive.

In the form shown in Figs. 1 to 7 inclusive, 1 designates the cutting members of which there are two in the present embodiment, each member being bounded by a single plane surface and a single curved surface and the curved surface being provided with cutting projections 2, which are preferably in the form of conical spikes. The cutters 1 are rotatably mounted on opposite sides of a supporting tongue 3 which projects down from a sub 4 which has a threaded tapered screw joint 5 and a flange 6 which is adapted to seat against the lower end of the socket or other portion of the channel connection to which the drill is attached. The tongue 3 is wedge shaped and each cutter 1 has a hub 7 which is rotatable in a corresponding recess formed in the tongue 3. Each cutter is held in position by a screw stud 8, the head of which is recessed in the face of the cutter so that it does not interfere with the cutting action. The screw studs 8 do not act in any capacity to receive any appreciable strain produced from the cutting operation as all such strain is borne by the hub 7 and as this may be of as large a size as desired, ample opportunity is afforded for strong bearings which will wear indefinitely without loosening. As the two cutters are located on opposite sides of the tongue 3 the pressures are balanced so that they counteract each other. As the pressure is inward and upward the inclined faces of the tongue 3 cause the strain during the cutting operation to be distributed over the inner face of each hub 7, as well as on the circular shoulder thereon. This secures the maximum bearing function and distributes the wear. The proportions are such in this form that when the parts are assembled, there is a substantially perfect sphere formed. The sub 4 is formed with a water hole 9 and diverging channels 10 for carrying the water to the lower end of the tool to wash out the detritus.

In operation the tool is given a rotary motion and the cutters are thereby caused to slowly rotate on the screw studs 8 with an axial motion coincident with their bodily revolution, and the cutting projections or spikes 2 are thereby swept through the material dividing the same into small pieces, and as owing to the compound movement of each cutter, the projections thereon are not permitted to rotate in a horizontal plane, grooving is prevented and the spikes are drawn through the material in all directions and thereby the spikes are moved in numerous intersecting paths which effectually loosen and remove the material which is swept out of the hole by the water discharged from the channels 10.

If desired, the drill may be employed in connection with a reamer, as shown in Figs. 3 and 6, in which 10′ designates a sub carrying a plurality of vertical reamers 11 which are made the subject matter of my previous application, Serial No. 773,033, filed June 11, 1913. The spindles 12 of the reamers 11 are mounted in upper and lower rings 13 and 14 spaced respectively between the sub 10′ and flange 6, and a connecting sub 15 carried on the lower end of the drill pipe 16.

In the form shown in Figs. 8 and 9, the cutters $1^a$ are of substantially similar construction, but are mounted within a fork 17, each cutter being mounted on a stud 18 which is secured to the adjacent fork member, as clearly shown in Fig. 9. The fork members 17 are staggered as indicated in Fig. 8, to give a clearance between the cutters, so that only the projecting portion of each cutter is operating at one time to cut.

Fig. 10 illustrates one form of my invention, wherein the cutters $1^b$ are staggered to give clearance, said cutters being mounted on the tongue $3^b$.

In the form shown in Figs. 11 and 12, the cutters $1^c$ are similar in construction to the preceding cutters, but are mounted to rotate on a sleeve 19 which is solid, but has two portions eccentric to each other, so that the respective cutters $1^c$ are offset with respect to each other. 20 is a bolt with a square shank which passes through the sleeve 19 and holds the sleeve non revolubly in position in a fork 21, the fork 21 having squared holes to fit the bolt 20, so that the cutters $1^c$ are supported in the same horizontal plane, but occupy different vertical planes.

In the form shown in Figs. 13 and 14, cutters $1^d$ are constructed as in the previous forms and are mounted on a sleeve 22 which is supported by a bolt 23. In both forms shown in Figs. 11 to 14 inclusive, the sleeves 19 or 22 act to positively space the form members apart and thus make the fork virtually a single unit. This affords great strength and prevents the members of the fork from separating and also holds the members in alinement. The cutters are free to rotate on the sleeves and as there is no member from the fork extending between the cutters to support them, the hubs of the cutters are of the maximum length and meet at the center, thereby giving a long bearing for each cutter which will reduce friction and eliminate wear. This is an important advantage because in drills having cutters of a rotary disk type, the bearings therefore easily become worn, allowing the disk to spring or wabble, which causes an uneven action of the tool and poor cutting, and reduces its cutting ability.

What I claim is:

1. A rotary drill having a pair of cutting members, each of which is bounded by a single plane surface arranged at an angle to the vertical axis of the drill, and a single convexed surface, the convexed surfaces of said members being studded with numerous conical cutting projections.

2. In a rotary drill, a supporting means, and a pair of cutters rotatably mounted on said supporting means and being of such form that together they form substantially a sphere, each of said cutters being bounded by a single plane surface and a single convexed cutting surface.

3. A rotary drill comprising supporting means having a substantially wedge-shaped tongue, and a pair of cutters secured to said tongue on opposite sides thereof, each of said cutters being bounded by a convexed surface that is closely studded with radially-disposed cutting spikes and a plane surface that lies substantially parallel to one side of said tongue.

4. A rotary drill comprising supporting means formed with a substantially wedge-shaped tongue having bearing recesses in opposite sides thereof, and a pair of cutters, each having a hub mounted in a recess of the tongue, each cutter being bounded by a convexed face that is closely studded with projecting spikes and an angularly-disposed plane surface on which said hub is formed.

5. A rotary drill, comprising a head provided at its lower end with a substantially wedge-shaped portion having recesses formed in the opposite side faces thereof, two oppositely-inclined cutters rotatably mounted on the side faces of said portion and being of such form that together they form substantially a sphere, and hubs on said cutters that fit in said recesses.

In testimony whereof, I have hereunto set my hand at Los Angeles, California this 18 day of September, 1913.

THOMAS J. GRIFFIN.

In presence of—
G. T. HACKLEY,
LORRAINE E. DURROW.